(12) United States Patent
Pontius

(10) Patent No.: US 7,098,779 B2
(45) Date of Patent: Aug. 29, 2006

(54) METHOD OF PROVIDING NOTIFICATION OF AN AIR INTAKE RESTRICTION

(75) Inventor: Stephen M. Pontius, Milford Center, OH (US)

(73) Assignee: International Engine Intellectual Property Company, LLC, Warrenville, IL (US)

( * ) Notice: Subject to any disclaimer, the term of this patent is extended or adjusted under 35 U.S.C. 154(b) by 122 days.

(21) Appl. No.: 10/376,012

(22) Filed: Feb. 27, 2003

(65) Prior Publication Data

US 2004/0178895 A1 Sep. 16, 2004

(51) Int. Cl.
*B60Q 1/00* (2006.01)

(52) U.S. Cl. ............... 340/439; 340/438; 340/606; 340/607; 340/425.5; 123/339.16; 123/479

(58) Field of Classification Search .......... 340/439, 340/438, 606, 607, 608, 611, 425.5; 73/116, 73/118.1, 118.2; 123/339.15, 406.13, 479, 123/568, 571, 339.16
See application file for complete search history.

(56) References Cited

U.S. PATENT DOCUMENTS 5,205,261 A * 4/1993 Betts et al. ............... 123/494
5,526,645 A * 6/1996 Kaiser ....................... 60/611
5,621,167 A * 4/1997 Fang-Cheng ............. 73/118.1
6,327,980 B1 * 12/2001 Chen et al. ............. 105/26.05
6,732,031 B1 * 5/2004 Lightner et al. ............ 701/33

FOREIGN PATENT DOCUMENTS

DE 019710981 A1 * 10/1998

OTHER PUBLICATIONS

Kohler Co., "Kohler Filter Minder," Jan. 7, 2003 www.tulsaenginewarehouse.com/catalog/kohler/accessories/airintake/minder/.

* cited by examiner

*Primary Examiner*—Tai Nguyen
(74) *Attorney, Agent, or Firm*—Elias P. Soupos; Susan L. Lukasik; Dennis K. Sullivan

(57) ABSTRACT

Notification of an air intake restriction is provided for an internal combustion engine (101). Readings from one or more air pressure sensors (117, 119) utilized with an internal combustion engine (101) are processed to determine whether an air intake restriction is present. A notification is provided, for example, by displaying (209) a message on a display (123) in a driver's station of a vehicle housing the engine. Various data, including detection of an air intake restriction, may be transmitted (215) for use by personnel, for example, to provide maintenance.

20 Claims, 2 Drawing Sheets

METHOD OF PROVIDING NOTIFICATION OF AN AIR INTAKE RESTRICTION

FIELD OF THE INVENTION

This invention relates to engine sensors, including but not limited to the interpretation of engine sensors to provide useful information to the operator of a vehicle including an internal combustion engine.

BACKGROUND OF THE INVENTION

The use of turbochargers to provide compressed air for internal combustion engines is known. The turbocharger compresses the air, which is then cooled in an intercooler prior to being supplied to an air intake manifold for the cylinders of the engine. The intercooler provides a denser air stream to the engine, which stream is more efficiently combusted, thereby reducing emissions levels of the engine. Internal combustion engines are also known to operate without turbochargers.

Various different engine components are present in the air intake path, including filters, intercoolers, compressors, turbines, and so forth. If any of these devices develops or encounters a restriction of air flow, the air-fuel ratio for the engine is reduced, resulting in increased oxides of nitrogen (NOx) emissions levels and increased fuel consumption.

Accordingly, there is a need for a method and apparatus to detect air flow restrictions.

SUMMARY OF THE INVENTION

A method of providing notification of an air intake restriction includes the steps of determining a manifold air pressure that is present in an intake manifold of an internal combustion engine and comparing the manifold air pressure to a predetermined value. When the manifold air pressure exceeds a predetermined value, a notification that an air intake restriction is present is provided by automatically sending the notification through an electronic system of the vehicle. Alternatively, a pressure external to the engine may be compared to the manifold air pressure to determine whether an air intake restriction is present.

DESCRIPTION OF A PREFERRED EMBODIMENT

The following describes an apparatus for and method of providing notification of an air intake restriction for an internal combustion engine. Readings from one or more air pressure sensors utilized with an internal combustion engine are processed to determine whether an air intake restriction is present. A notification is provided, for example, by displaying a message on a display in a driver's station of a vehicle housing the engine. Various data, including detection of an air intake restriction, may be transmitted for use by personnel, for example, to provide maintenance.

Figure 1:
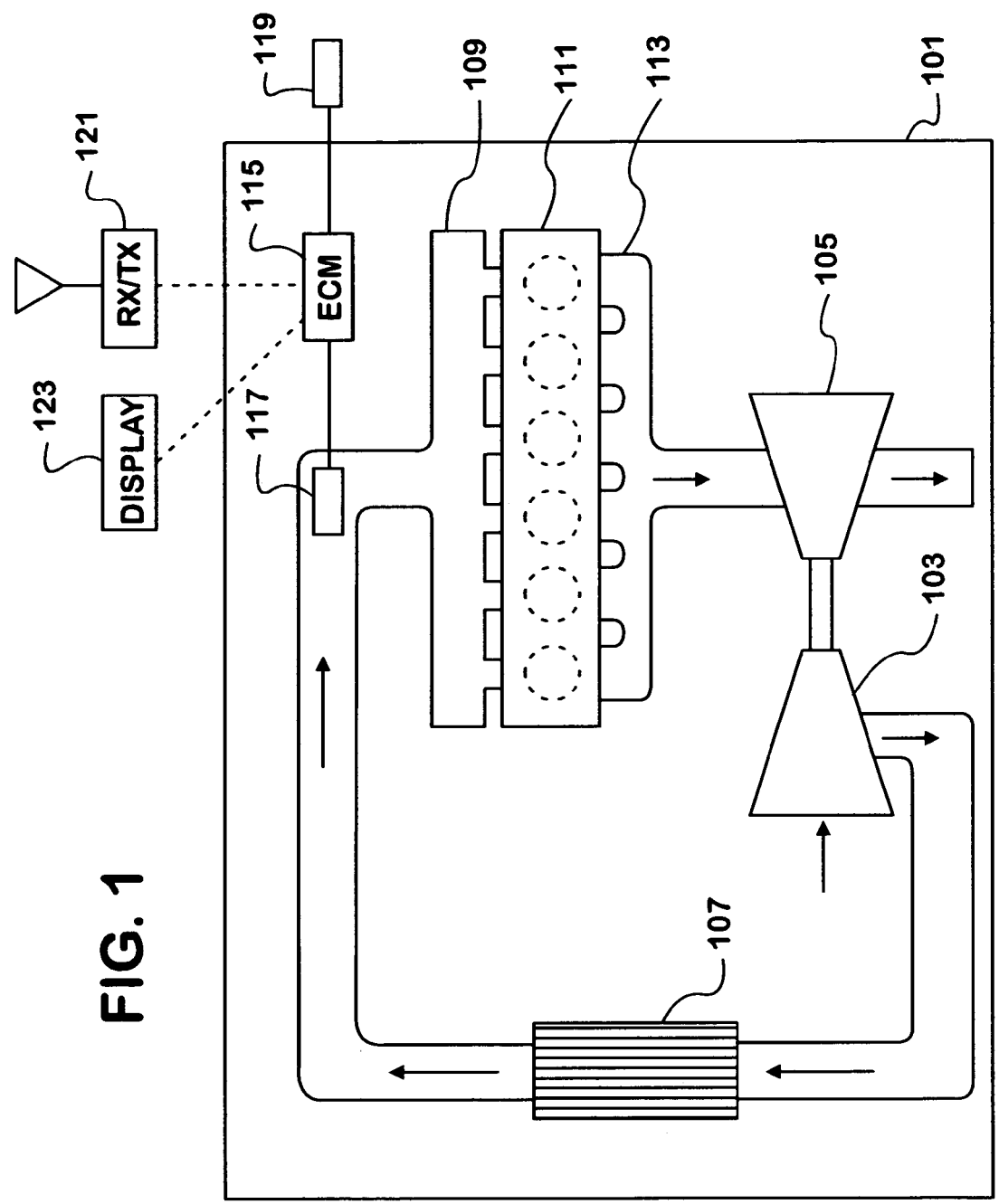
FIG. 1 is a block diagram of an engine having a plurality of sensors in accordance with the invention.

A diagram of an internal combustion engine 101 having a plurality of sensors is shown in FIG. 1. Air enters the air intake of a turbocharger through a compressor 103 that is connected via a shaft to a turbine 105. The turbocharger outputs compressed air via a discharge pipe into an intercooler 107. The intercooler 107 cools the compressed air, and the resultant cooled air enters the air intake manifold 109 via an intake pipe. Air from the intake manifold 109 enters cylinders in an engine block 111 at a boost pressure, also known as an air intake manifold pressure. The cylinders output exhaust gas into an exhaust manifold 113, which gas enters the turbine 105 and an exhaust gas recirculation system (not shown for the sake of simplicity).

An engine control module (ECM) 115 detects various engine conditions and receives signals from a plurality of sensors. The ECM 115 may be a conventional engine control module that is readily available in the industry. One of the sensors is a manifold air pressure, also known as manifold absolute pressure, (MAP) sensor 117, which is disposed in the path between the intercooler 107 and the engine block 111. MAP sensors are readily available in the industry. The MAP sensor 117 determines the air pressure in the intake manifold path. Another sensor is a barometric air pressure (BAP) sensor 119, which is disposed outside the engine 101. For example, the BAP sensor 119 my be placed, for example, in the cab of the vehicle, in the ECM 115, or other locations known for positioning the BAP sensor 119. BAP sensors are readily available in the industry. The BAP sensor 119 determines the external air pressure that is present outside the engine 101.

A communication unit 121 receives and transmits information or data. The communication unit 121 may be a wireless device, such as a two-way radio, cellular telephone, or other known wireless receiver and/or transmitter as known in the art. The communication unit 121 may also or alternatively include a wireline communication device that has one or more connections for sending/transmitting and/or receiving data over a wireline communication path to other devices, such as engine monitoring devices or maintenance computers. Although the communication unit 121 is shown connected to the ECM 115, the communication unit 121 may additionally or alternatively be connected to other electronic devices in the vehicle, e.g., a dashboard control module, electronic control unit (ECU), or multiplex module.

Figure 2:
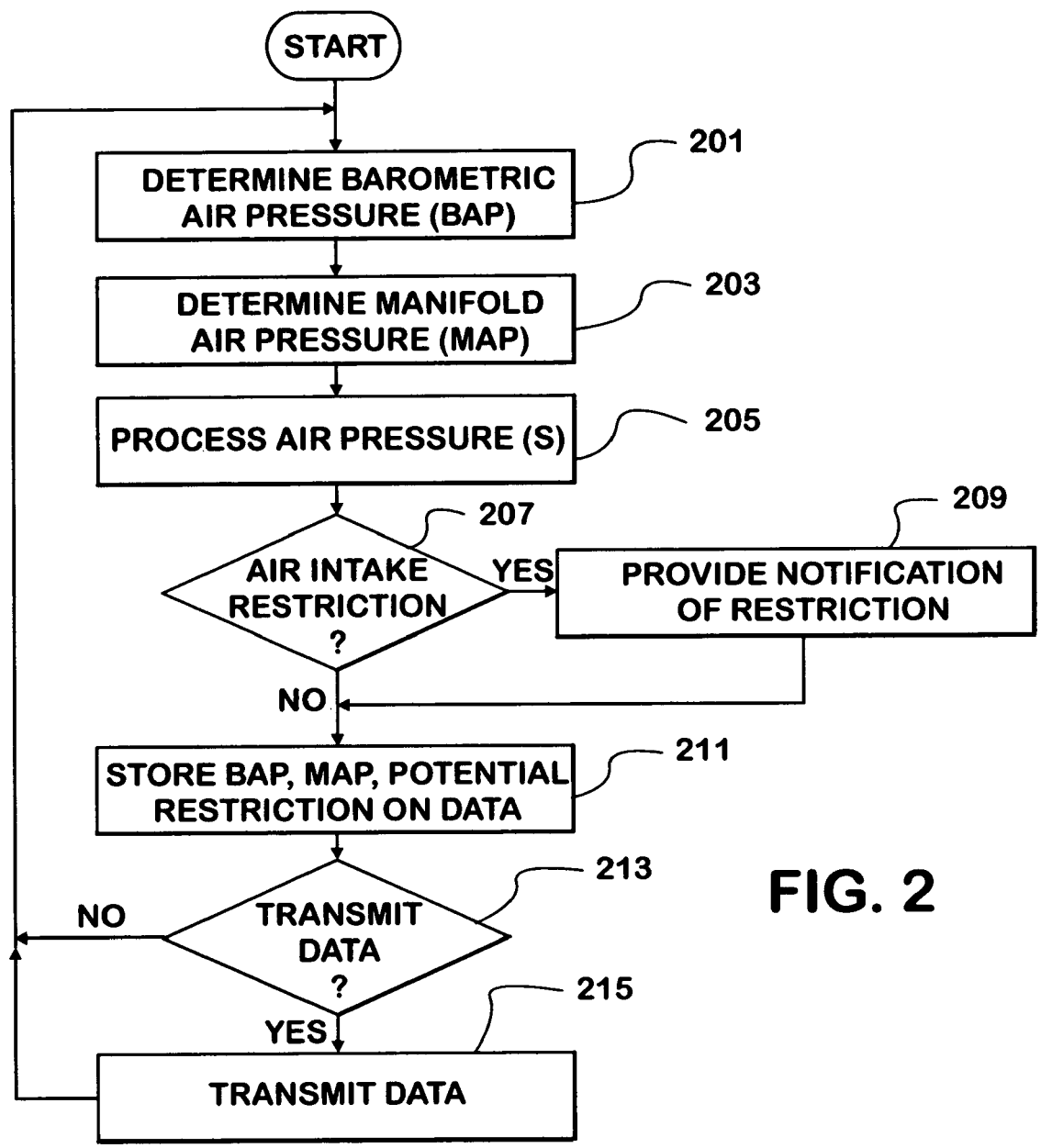
FIG. 2 is a flowchart illustrating a method of utilizing engine sensor data in accordance with the invention.

A flowchart illustrating a method of utilizing engine sensor data is shown in FIG. 2. The steps of the flowchart are advantageously performed by the ECM 115. At step 201, the air pressure external to the engine, e.g., barometric air pressure (BAP), is determined, for example, by receiving a BAP reading from the BAP sensor 119. Step 201 is optional. At step 203, the manifold air pressure (MAP) is determined, for example, by receiving a MAP reading from the MAP sensor 117. Steps 201 and 203 may be performed simultaneously or in any order. At step 205, the air pressure(s), e.g., BAP and MAP, are processed. The BAP and MAP signals may be directly compared, for example, by subtracting one from the other. The BAP and MAP signals may be analog signals that are converted to digital signals, for example by an analog-to-digital (A/D) signal converter such as a 10-bit A/D converter. Other A/D converters may be utilized. A microprocessor in the ECM 115 processes the signals, as known in the art. Alternatively, the MAP signal may be processed into a desired pressure reading, if not already provided as such, and/or directly compared to an absolute pressure. The unit of measure, e.g., millimeters of mercury, Pascals (Pa), atmospheres, inches (in) $H_2O$, and so forth should be the same when comparing values, as known in the art.

If at step 207 an air intake restriction is present, the process continues with step 209. An air intake restriction is presumed to be present, for example, when the difference between the BAP and MAP is beyond a predetermined threshold, such as 15 in H2O or 3.7 kPa, or when the MAP is beyond (e.g., below) a predetermined value, such as 22 in H2O or 5.5 kPa. Intermittent and continuous air intake restrictions may be detected. Air intake restrictions include, but are not limited to, foreign objects that have entered the initial air intake from outside the vehicle, excess dirt in the air filter, and damaged apparatus (e.g., pipes, the intercooler, joints, and so forth) in the intake path, such as from a collision.

At step 209, notification of the detected air intake restriction is provided. Such notification is intended for the operator of the vehicle housing the engine 101. For example, such notification may include a signal or message sent to a display 123 in a driver's station of the vehicle. The display 123 may be controlled, for example, by the ECM 115. The driver's station, such as the cab of a truck or the driver's area of an automobile, may include various different displays, including the dashboard, part of a console, part of the steering wheel or column, overhead displays, and displays that are projected onto a windshield. The notification may include, for example, illuminating a light on a display, displaying a visual message comprised of symbols or letters, such as "ATTENTION: AIR INTAKE RESTRICTION," conveying a verbal or audio message, and so forth. Instructions, such as "REPLACE AIR FILTER," "SERVICE SOON," or "ACTION REQUIRED" may be directed to the operator. The operator of the vehicle may be the current driver of the vehicle or other personnel concerned with the operating status of the vehicle.

After step 209, or after step 207 if no air intake restriction is detected, the process continues with step 211, where BAP, MAP, restriction detection, time of restriction detection, any potential restriction data, and so forth are stored. Potential restriction data includes, for example, BAP and MAP comparison data or MAP data that does not quite meet the desired threshold at step 207, but suggests a partial restriction may be present. The storing step may take place any time during the process once data becomes available. Data may be stored in memory, for example, in the ECM 115, in the communication unit 121, or in other locations where the data may be retrieved.

At step 213, it is determined whether it is time to transmit any data. Data may be transmitted, for example, at periodic times. Data may be transmitted when certain events occur, such as any air restriction detection, such as found at step 207, or potential air restrictions of various levels. Data may be transmitted at the request of maintenance personnel, who may perform routine or random maintenance checks. Maintenance personnel may transmit a data request that is received by the communication unit 121 or may directly download data from the device. If at step 213, it is time to transmit data, the data is transmitted at step 215.

At step 215, the BAP, MAP, and/or restriction data is transmitted, via the communication unit 121, to maintenance personnel, for example, so that they may schedule maintenance for the engine 101, depending on the severity of any air intake restriction, or store the data for future reference.

Although the present invention is illustrated by the example of a vehicle having a six-cylinder engine with a turbocharger, the present invention may be applied to vehicles of various types, including but not limited to trucks, motorcycles, automobiles, and so forth, as well as to vehicles including: engines having two or more cylinders, including those with less than or greater than six cylinders; various engine types, such as I-6, V-6, V-8, and so forth; diesel engines, gasoline engines, or other types of engines; turbocharged or non-turbocharged engines; and engines of any size.

The present invention has several advantages over an add-on air pressure gauge, e.g., one that is inserted into a hole placed in a hose at the output of an engine's air filter and includes a gauge that is manually read by an operator. Because the present invention utilizes internal and external engine sensors to determine air pressure at different places in the present invention, additional hardware need not be added to an engine compartment for any purpose, including to read the air pressure and/or notify the operator of a restriction. The present invention also provides the advantage that the vehicle operator does not have to remember to read the air pressure gauge. When the present invention is embodied in the ECM (or other computer in the vehicle), the ECM (or other computer in the vehicle) is capable of notifying an operator of the engine that air restrictions are present without having to add additional wires or display mechanisms as would be necessary to provide such a feature with an add-on air pressure gauge. The present invention provides for the ability to check for restrictions any where in the path from the outside of the vehicle to the position of the MAP sensor 117, which includes the intercooler and various intake pipes, whereas the add-on gauge at best provides the ability to detect restrictions from the outside of the vehicle to the air filter. Because add-on gauges are typically inserted into a hole made in a hose, there is potential for leakage in the hose where the gauge is inserted.

The present invention provides a method that utilizes engine sensors to detect air flow restrictions in the air intake path of an internal combustion engine. When an air flow restriction is detected, the operator of the vehicle housing the internal combustion engine is notified, and maintenance personnel may be notified as well. By maintaining a good air-fuel ratio in the engine, desired emissions levels and fuel consumption are preserved. Various data may be compared, stored, and transmitted to provide better engine maintenance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising the steps of:
   determining an external air pressure that is external to an internal combustion engine;
   determining a manifold air pressure that is present in an intake manifold of the internal combustion engine;
   comparing the external air pressure to the manifold air pressure;
   when the manifold air pressure differs from the external air pressure by an amount greater that a predetermined value, and when en air filter of the internal combustion engine is not clogged,
   determining that damage in an intake path exists; and,
   providing a notification that damage in the intake path is present.

2. The method of claim 1, wherein the step of determining the external air pressure comprises the step of receiving a barometric air pressure signal from barometric air pressure sensor to determine the external air pressure.

3. The method of claim 2, wherein the barometric air pressure sensor is electronically connected to an engine control module for the internal combustion engine.

4. The method of claim 1, wherein the step of determining the manifold air pressure comprises the step of receiving a manifold air pressure signal from a manifold air pressure sensor to determine the manifold air pressure.

5. The method of claim 4, wherein the manifold air pressure sensor is electronically connected to an engine control module for the internal combustion engine.

6. The method of claim 1, wherein damage in the intake path is at least one of a leak and damage due to a collision.

7. A method comprising the steps of:
   determining a manifold air pressure that is present in an intake manifold of an internal combustion engine;
   comparing the manifold air pressure to a predetermined value;
   when the manifold air pressure is below the predetermined value and an air filter of the internal combustion engine is not clogged,
   providing a notification that damage in an intake path exists, wherein the intake path includes at least one of a pipe, an intercooler, and a joint; and automatically sending the notification through an electronic system of the vehicle.

8. The method of claim 1, further comprising the step of transmitting via a wireless device at least one of the external air pressure and the manifold air pressure.

9. The method of claim 1, further comprising the step of transmitting a notification of air intake restriction when the manifold air pressure differs from the external air pressure by an amount greater than a predetermined value.

10. The method of claim 1, wherein the intake path includes at least one of a pipe, an intercooler, and a joint.

11. The method of claim 1, wherein the step of providing comprises sending an electronic signal to a display in a driver's station of the vehicle through an internal electrical system of the vehicle.

12. A method comprising the steps of:
   determining a manifold air pressure that is present in an intake manifold of an internal combustion engine;
   processing the manifold air pressure into a desired pressure reading;
   comparing the manifold air pressure to the desired pressure reading;
   when the manifold air pressure is below the desired pressure reading and when an air filter of the internal combustion engine is not clogged, providing a notification that damage in an intake path exists by automatically sending the notification through an electronic system of a vehicle.

13. The method of claim 12, wherein the step of determining the manifold air pressure comprises the step of receiving a manifold air pressure signal from a manifold air pressure sensor to determine the manifold air pressure.

14. The method of claim 13, wherein the manifold air pressure sensor is electronically connected to an engine control module for the internal combustion engine.

15. The method of claim 13, wherein the manifold air pressure sensor is disposed entirety within the intake manifold.

16. The method of claim 12, wherein the steps of the method are performed by an engine control module for the internal combustion engine.

17. The method of claim 12, further comprising the step of transmitting via a wireless device at least the manifold air pressure.

18. The method of claim 12, further comprising the step of transmitting a notification of air intake restriction when the manifold air pressure differs from a predetermined value.

19. The method of claim 12, wherein the step of providing comprises displaying the notification to an operator of a vehicle housing the internal combustion engine and transmitting via a wireless device the notification to a receiver remote from the vehicle.

20. The method of claim 12, wherein the step of providing comprises sending an electronic signal to a display in a driver's station of the vehicle.

* * * * *